United States Patent
Gagnon et al.

(10) Patent No.: US 11,947,033 B2
(45) Date of Patent: Apr. 2, 2024

(54) DFS RADAR DETECTION

(71) Applicant: Hewlett Packard Enterprise Development LP, Houston, TX (US)

(72) Inventors: Jean-Francois Gagnon, St. Laurent (CA); Andre Beaudin, St. Laurent (CA); Myung Cheol Kim, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 261 days.

(21) Appl. No.: 16/863,002

(22) Filed: Apr. 30, 2020

(65) Prior Publication Data

US 2021/0341570 A1 Nov. 4, 2021

(51) Int. Cl.
*G01S 7/292* (2006.01)
*G01S 7/02* (2006.01)
*G01S 7/288* (2006.01)
*H04W 72/0453* (2023.01)

(52) U.S. Cl.
CPC ............ *G01S 7/2927* (2013.01); *G01S 7/021* (2013.01); *G01S 7/288* (2013.01); *H04W 72/0453* (2013.01)

(58) Field of Classification Search
CPC ........ G01S 7/2927; G01S 7/021; G01S 7/288; G01S 7/28; H04W 72/0453; H04W 72/044; H04W 72/04; H04W 72/12; H04W 72/00; H04W 80/00; H04W 16/14
See application file for complete search history.

(56) References Cited

U.S. PATENT DOCUMENTS

| | | | | |
|---|---|---|---|---|
| 5,047,775 A * | 9/1991 | Alitz | ...................... | G01S 7/282 342/26 D |
| 9,807,619 B2 * | 10/2017 | Tsai | ........................ | G01S 7/021 |
| 10,254,386 B1 * | 4/2019 | Beaudin | ................. | H04K 3/226 |
| 10,362,489 B1 * | 7/2019 | Desai | .................... | H04W 16/14 |
| 2004/0047324 A1 * | 3/2004 | Diener | .................. | H04L 1/1664 370/319 |
| 2007/0281638 A1 * | 12/2007 | Hansen | ................... | G01S 7/021 455/73 |
| 2009/0310661 A1 * | 12/2009 | Kloper | ................. | H04B 17/318 375/224 |
| 2010/0039308 A1 * | 2/2010 | Bertagna | ................ | G06Q 40/04 342/20 |
| 2015/0063321 A1 * | 3/2015 | Sadek | .................... | H04K 3/224 370/336 |
| 2015/0117186 A1 * | 4/2015 | Uchida | ................. | H04W 28/20 370/230 |
| 2018/0332583 A1 * | 11/2018 | Shah | ..................... | H04W 16/14 |

(Continued)

FOREIGN PATENT DOCUMENTS

WO WO-2019136753 A1 * 7/2019 ............. G01S 7/003

*Primary Examiner* — Timothy A Brainard
*Assistant Examiner* — Kenneth W Good
(74) *Attorney, Agent, or Firm* — Hewlett Packard Enterprise Patent Department

(57) ABSTRACT

A method for improving dynamic frequency selection (DFS) includes receiving, by an access point, a plurality of pulses in a DFS channel of the access point, determining, by the access point, a plurality of characteristics of the plurality of pulses, varying, by the access point, a threshold for radar detection, and determining, by the access point and based on at least one of the plurality of characteristics, whether the plurality of pulses are radar.

20 Claims, 6 Drawing Sheets

(56) References Cited

U.S. PATENT DOCUMENTS

2019/0364598 A1* 11/2019 Ringland .............. H04W 16/14
2020/0110152 A1*  4/2020 Yankevich ............. G01S 13/24
2020/0383049 A1* 12/2020 Tellado ................ H04W 24/04

* cited by examiner

| Pulse #ID | Pulse Interval | Pulse Width | Match Spec. ? | Consecutive |
|---|---|---|---|---|
| 0 | 300us | 40us | No | |
| 1 | 300us | 100us | No | |
| 2 | 300us | 54us | No | |
| 3 | 300us | 15us | Yes | 1 |
| 4 | 300us | 15us | Yes | 2 |
| 5 | 300us | 15us | Yes | 3 |
| 6 | 300us | 15us | Yes | 4 |
| 7 | 300us | 15us | Yes | 5 |
| 8 | 300us | 15us | Yes | 6 |
| 9 | 300us | 15us | Yes | 7 |
| 10 | 300us | 15us | Yes | 8 |
| 11 | 300us | 15us | Yes | 9 |
| 12 | 300us | 15us | Yes | 10 |
| 13 | 300us | 15us | Yes | 11 |
| 14 | 300us | 15us | Yes | 12 |
| 15 | 300us | 15us | Yes | 13 |
| 16 | 300us | 15us | Yes | 14 |
| 17 | 300us | 15us | Yes | 15 |
| 18 | 300us | 15us | Yes | 16 |
| 19 | 300us | 49us | No | |
| 20 | 9000us | 40us | No | |
| 21 | 300us | 15us | No | |
| 22 | 9000us | 15us | No | |
| 23 | 300us | 1us | No | |

Fig. 5

DFS RADAR DETECTION

DESCRIPTION OF RELATED ART

Dynamic frequency selection (DFS) is a channel allocation scheme for Wi-Fi to prevent interference with other uses of the frequencies. One example is radar—Doppler weather radar uses the 5 GHz band and when Wi-Fi also uses the 5 GHz band, the weather radar experiences significant degradation. Thus, varies countries or other jurisdictions require Wi-Fi to automatically switch frequencies when radar is detected. However, the detection of a radar pulse may include false positives, even when following the guidelines or regulatory requirements. These false positives may impact the performance of the Wi-Fi network. Thus, improvements are needed to reduce the false detection of radar.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 5 depicts an example of improved DFS radar detection in accordance with one or more embodiments.

The figures are not exhaustive and do not limit the present disclosure to the precise form disclosed.

DETAILED DESCRIPTION

Improving the DFS functionality of Wi-Fi can directly improve the user experience of Wi-Fi. Some networks may experience high amounts of interference from any number of sources. Sometimes, these interference events may be misinterpreted as radar. The interference may not be repeating—in other words it may be random, and unable to be filtered out by known methods. However, there have been many changes to Wi-Fi, in general, since DFS was standardized in 2003 as part of the Institute of Electrical and Electronics Engineers (IEEE) 802.11h standard.

Among other improvements, inventors have realized that when DFS was originally implemented, standard Wi-Fi access points operated in a narrower frequency band than they do now. For example, a 20 MHz bandwidth for a channel may have been standard in 2003, while nowadays channel bandwidths can include 160 MHz or more. With this increased bandwidth, stricter, more accurate radar pulse detection may be performed. This improved radar pulse detection may also include aspects never before considered by the standards or regulations, as well as improvements to aspects previously considered. Each of the different embodiments discussed herein may be performed in conjunction with one or more other embodiments, and/or with one or more previously existing methods of identifying radar. These improvements add to the toolkit available to reduce false positives.

Figure 1:
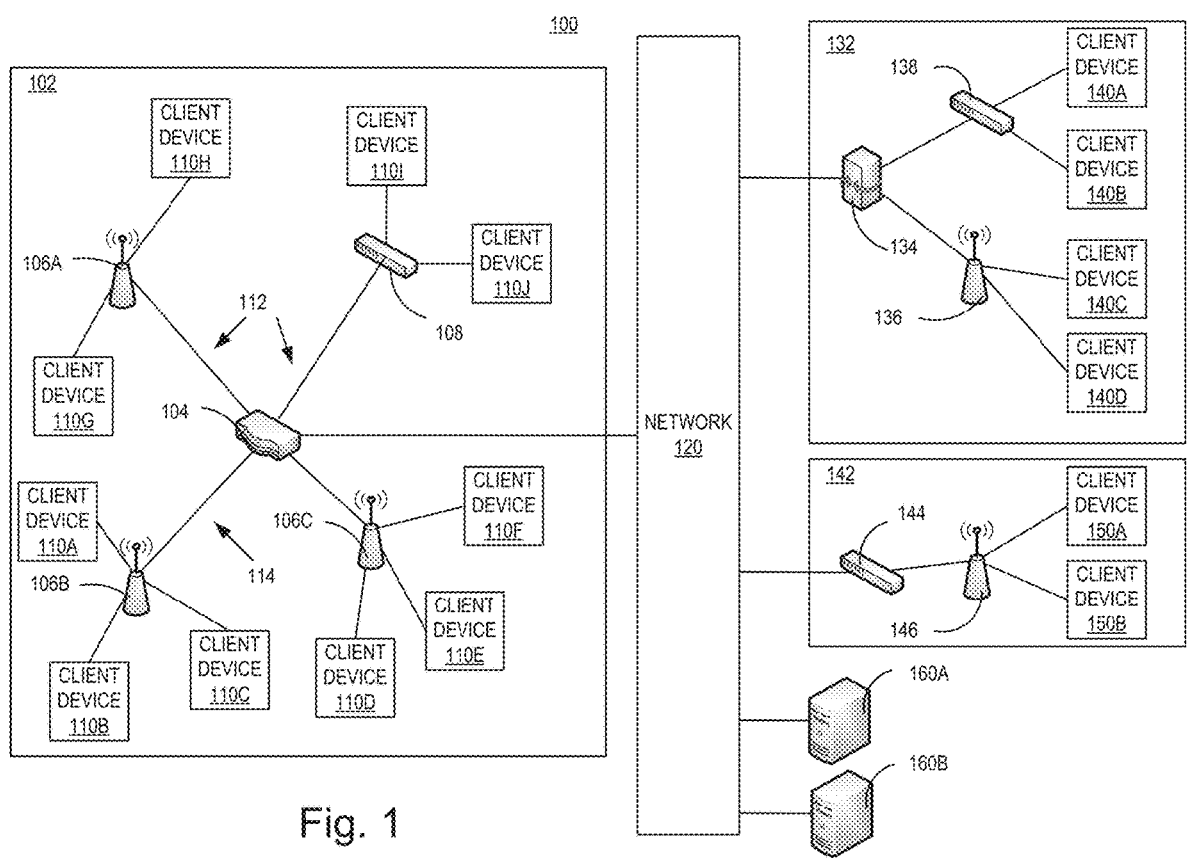
FIG. 1 illustrates one example of a network configuration that may be implemented for an organization, such as a business, educational institution, governmental entity, healthcare facility or other organization.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (Aps) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110*i-j*. Client devices 110*i-j* may connect to the switch 108 and through the switch 108, may be able to access other devices within the network configuration 100. The client devices 110*i-j* may also be able to access the network 120, through the switch 108. The client devices 110*i-j* may communicate with the switch 108 over a wired 112 connection. In the illustrated example, the switch 108 communicates with the controller 104 over a wired 112 connection, though this connection may also be wireless.

Wireless APs 106*a-c* are included as another example of a point of access to the network established in primary site 102 for client devices 110*a-h*. Each of APs 106*a-c* may be a combination of hardware, software, and/or firmware that is configured to provide wireless network connectivity to wireless client devices 110*a-h*. In the illustrated example, APs 106*a-c* can be managed and configured by the controller 104. APs 106*a-c* communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140*a-d*.

In various embodiments, the remote site 132 may be in direct communication with primary site 102, such that client devices 140*a-d* at the remote site 132 access the network resources at the primary site 102 as if these clients devices 140*a-d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the primary site 102, such that the client devices 150*a-b* at remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a* j, 140*a-d*, 150*a-b* may request and access the multimedia content provided by the content servers 160*a-b*.

The portions of network 120 and/or the individual sites 102, 132, 142, may utilize DFS channels for communication. These DFS channels are required to automatically be vacated upon receipt of a valid radar signal. The valid radar signals may correspond to any suitable standard or standards, and may vary based upon the country, region, or jurisdiction in which the network and/or individual site 102, 132, 142 is located. Vacating a DFS channel can impact the experience of users of the network. Thus, it is desirable to not unnecessarily switch channels. However, interference may accidentally look like a radar signal, creating a false positive.

Figure 2:
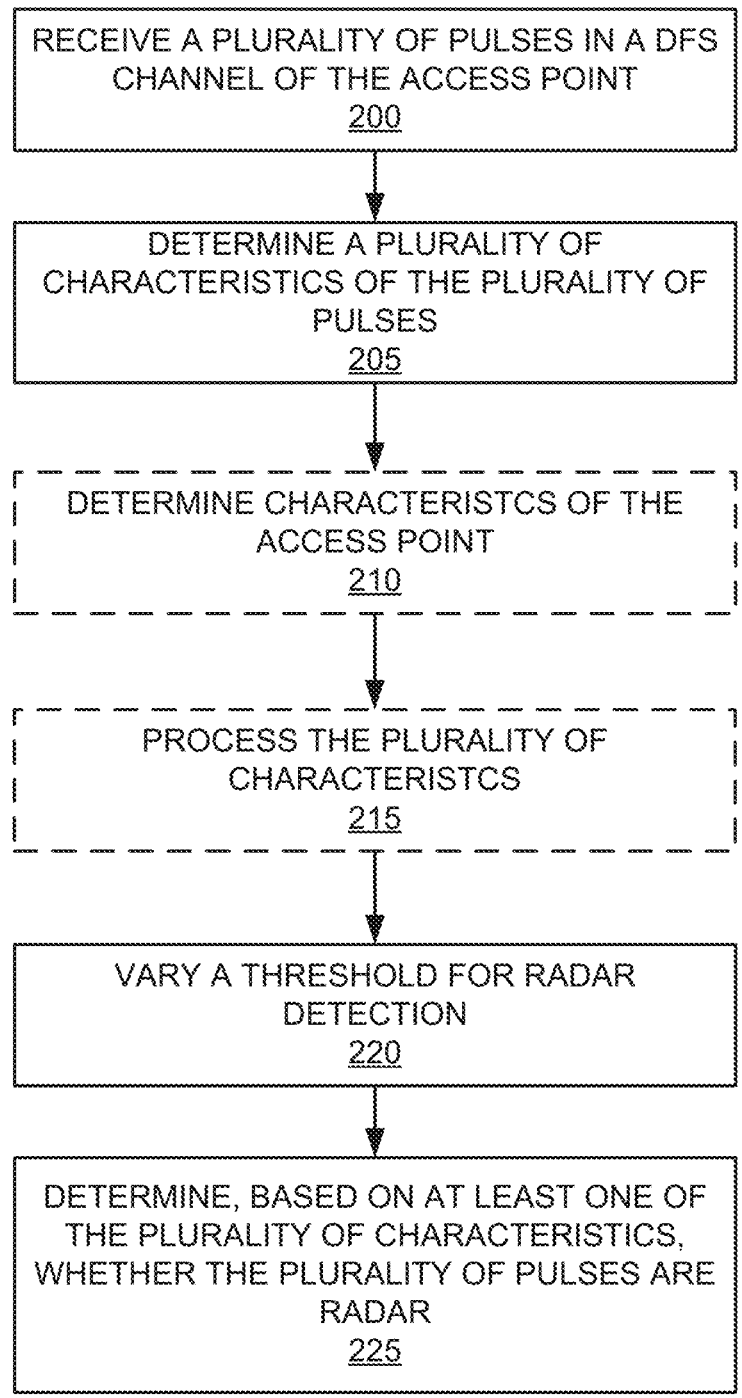
FIG. 2 depicts a flowchart of a method for improved DFS radar detection in accordance with one or more embodiments.

FIG. 2 depicts a flowchart of a method for improved DFS radar detection in accordance with one or more embodiments. Although the steps in FIG. 2 are shown in an order, it is not the only order for the steps. The steps may be performed at any time, in any order. Additionally, the steps may be repeated or omitted as needed.

Additionally, the steps may be performed by any suitable device, such as an access point, controller, switch, computing device, network infrastructure device, etc. The suitable device may include a hardware processor (not shown), such as one or more central processing units (CPUs), semiconductor-based microprocessors, and/or other hardware devices suitable for retrieval and execution of instructions stored in a machine-readable storage medium (not shown). The hardware processor may fetch, decode, and execute instructions, to control processes or operations for improving DFS radar detection in accordance with one or more embodiments. As an alternative or in addition to retrieving and executing instructions, hardware processor may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, a machine-readable storage medium may be, for example, Random Access Memory (RAM), non-volatile RAM (NVRAM), an Electrically Erasable Programmable Read-Only Memory (EEPROM), a storage device, an optical disc, and the like. In some embodiments, a machine-readable storage medium may be a non-transitory storage medium, where the term "non-transitory" does not encompass transitory propagating signals.

In step 200 a plurality of pulses are received in a DFS channel of an access point. The plurality of pulses may consist of any number of pulses. The pulses may be received at any interval, from any number of sources, and at any time. The source of the pulses may be, for example, a radar or interference. The pulses may be received at any frequency and may be received by one or more access points or other suitable devices.

In step 205, a plurality of characteristics of the plurality of pulses are determined. The characteristics of the pulses may be determined in any suitable manner. Any number of characteristics may be determined. The amount of characteristics determined may vary dynamically based on any factors. The characteristics may be determined by any suitable device, component, entity, or process.

The characteristics may include, but are not limited to: a timestamp, a pulse width, an autocorrelation, a phase linearity, a frequency offset, and a chirp. A timestamp is the time at which a given pulse is received, and may be used to determine the pulse interval, which is the time between consecutive pulses, typically in microseconds. A pulse width, also known as pulse duration, is the duration of pulse transmission time, typically in microseconds. Autocorrelation is the degree of similarity between a given time series and a lagged version of itself over successive time intervals. The autocorrelation may be a rating or score, and not a precise value. Phase linearity is the maximum deviation from a straight line of the plot of the phase versus the frequency. The phase linearity may be a rating or score, and not a precise value. The frequency offset is the frequency of the detected pulse relative to the AP or absolutely, and can be used, among other things, to reduce interference with other transmitters. Chirp is the amount in which the frequency increases or decreases with time.

In step 210, characteristics of the access point are determined. The characteristics of the access point may include the bandwidth on which the access point is receiving signals, the number of radios, and any other characteristics. As indicated by the dotted line, step 210 is optional and may or may not be performed. Additionally, step 210 may be performed in a different order or at a different time than shown in FIG. 2.

In step 215, the plurality of characteristics are processed. The plurality of characteristics, of both the plurality of pulses and the access point, may be processed in any manner and at any time. As indicated by the dotted line, step 215 is optional and may or may not be performed, and may be performed in a different order or time than shown in FIG. 2. In particular, step 215 may be performed continuously or in response to receiving any potential radar signal.

One type of processing may be a burst distance check. Because the specifications of radar are known ahead of time, checks may be performed to ensure that the bursts match the specifications of the radar. For example, depending on the radar, there will be a set amount of bursts per microsecond(s). This means that a check may be performed using the burst length and the timing of the received bursts to ensure that the bursts received match radar.

Another type of processing may be checking burst frequency probability distribution. Burst frequency probability distribution relies on the fact that frequency hopping radars will, given a large enough bandwidth and timeframe on which to detect the radar pulses, distribute their hops relatively evenly amongst the available frequencies. The burst frequency probability may be checked by measuring the average frequency and comparing the average frequency to a threshold amount, such as +0 MHz. Some deviation from 0 may be acceptable, and may be set to a suitable amount by any suitable entity. Alternatively, the burst frequency probability may be checked by splitting the bandwidth into parts and checking that the parts are more or less equal.

Another type of processing may be grouping of similar pulses. For example, if one of the characteristics of a pulse is identical to the same characteristic of a previous pulse, the pulses may be classified as part of the same group. If a radar detection only uses a portion of the group, it shall not be classified as radar. This grouping may happen before and/or after a radar event.

Each of the types of processing may be used in conjunction, in any combination, and may be used with other pre-existing types of processing or radar detection methods. Each of the types identified above are discussed in more detail below.

In step 220, a threshold for radar detection is varied. The threshold may be varied based on the characteristics of the pulses, or from any of the processing done in step 215, or may be varied based on characteristics or state of the access point, or any combination thereof. There may be more than one threshold for radar detection depending on the type of radar, country or jurisdiction, or any other factor. Additionally, there may be multiple different thresholds for a same radar, depending on what information is available or based on any other factor(s). Additionally, the thresholds may be varied dynamically, at any time. Generally, the threshold will be varied based on the configured channel bandwidth. As an example, an increase in bandwidth of 2× will generally result in a threshold increase of 2× as well, as is roughly depicted in item 300 of FIG. 3. However, other ratios or changes are also within the scope of this invention.

In step 225, a determination is made, based on at least one of the plurality of characteristics, whether the plurality of pulses are radar. If they are radar, per DFS requirements, the channel will need to be vacated and a different channel will need to be used until the radar is gone and any wait period has expired. If they are not radar, monitoring of the channel for possible radar signals will continue.

Figure 3:
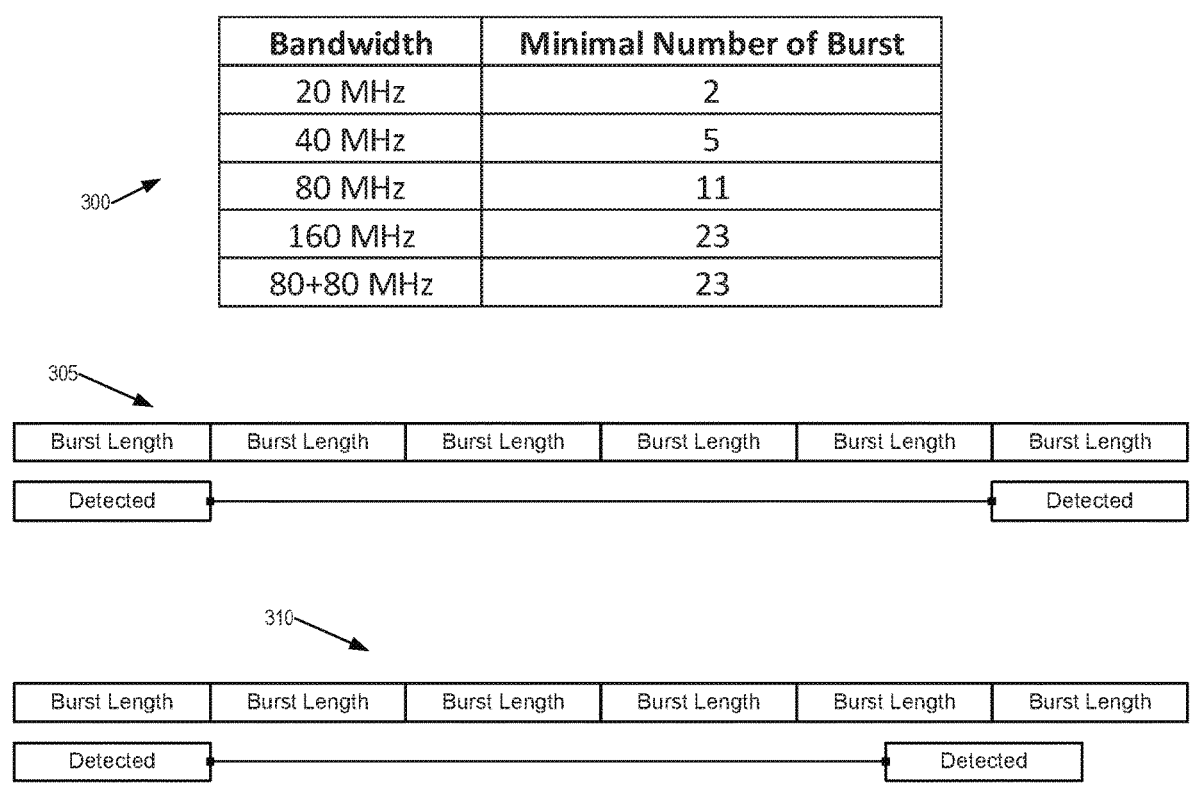
FIG. 3 depicts an example of improved DFS radar detection in accordance with one or more embodiments.

FIG. 3 depicts an example of improved DFS radar detection in accordance with one or more embodiments. In particular, FIG. 3 shows three different examples.

A table 300 is shown with an example of the changing burst requirements based on channel bandwidth. Some radars, such as Federal Communications Commission (FCC) 6, hop from frequency to frequency. These hops may make it impossible, or at least very difficult, to detect large amounts of pulses in a row. Thus, for a FCC-6 radar the common practice is that after detecting a single 9 pulse burst, a radar is determined to be identified. However, as the bandwidth of a channel increases, the amount of bursts needed to identify radar may be increased.

When a given access point has identified more than 9 pulses, the sequence may deemed to be ended, and added to a queue for tracking. The access point may then continue looking for additional 9 pulse bursts. The queue is maintained to prune out old burst after a predetermined amount of time. The predetermined amount of time may be based on specification requirements, or any other suitable basis. When the queue has enough bursts to satisfy the increased threshold, a positive radar identified is made, and the channel is changed. Instead of using a static burst requirement, the burst requirement is dynamic depending on the access point's bandwidth. This requirement may be based, in part, on statistics: using the algorithm detection rate of a burst, the effective bandwidth and the odds of going on each channel, we can decide a good amount of burst required. Thus, the numbers shown in table 300 are representative, and may be changed as needed.

FIG. 3 also shows a successful burst distance check 305. A burst distance check is another way to reduce false positives. Because the specifications of radar are known ahead of time, checks may be performed to ensure that the bursts match the specifications of the radar. For example, depending on the radar, there will be a set amount of bursts per microsecond(s). This means that a check may be performed using the burst length and the timing of the received bursts. Simple division (Distance/Burst length) will result in a remainder that can be used to assist in determining whether the bursts are radar. Specifically, anything over x and under y will be determined not to be radar. The variables x and y may be set to any suitable amount, by any suitable entity. For example, 0.1 and 0.9 may be used. Using those values, consider a burst length of 3009 useconds. Burst1 is received at time 3009, burst2 is received at 9028 time, and burst3 at 17304 time. Performing a burst distance check on burst2 gives (9027−3009)/3009=2.0. Because the remainder is 0 (and thus not in the 0.1 to 0.9 range consider to be not radar), the burst is valid. In contrast, the burst distance check on burst3 gives (17304−9028)/3009=2.75. The remainder here (0.75) is in the 0.1 to 0.9 range considered to not be radar, and therefore the burst check fails.

The example burst distance check 305 shown in FIG. 3 visualizes a successful burst check. The burst length boxes running along the top of 305 indicate the expected length/timings for bursts based on the first burst that was detected. The division of distance by burst length may equal 3.001 in burst check 305, which would indicate that the burst is valid. This is shown by the second detected burst lining up with the burst lengths.

In contrast, the example burst distance check 310 visualizes an unsuccessful burst check. Like the example shown in burst distance check 305, the burst length boxes running along the top of 310 indicate the expected length/timings for bursts based on the first burst that was detected. The division of distance by burst length may equal 3.43 in burst check 310, which would indicate that the burst is invalid. This is shown by the second detected burst length not lining up with the burst lengths.

Figure 4:
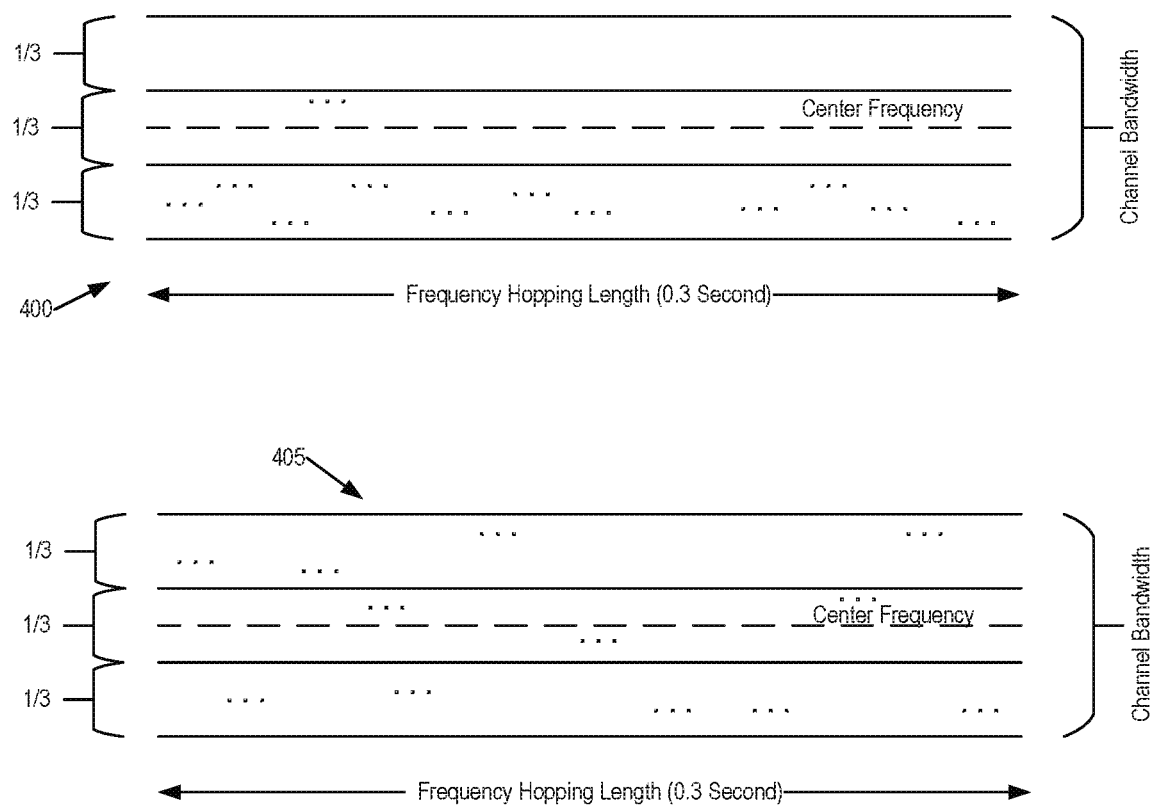
FIG. 4 depicts an example of improved DFS radar detection in accordance with one or more embodiments.

FIG. 4 depicts an example of improved DFS radar detection in accordance with one or more embodiments. In particular, FIG. 4 shows two different examples of checking the burst frequency probability distribution. Burst frequency probability distribution is another way to reduce false positives in detecting radar.

Burst frequency probability distribution relies on the fact that frequency hopping radars will, given a large enough bandwidth and timeframe on which to detect the radar pulses, distribute their hops relatively evenly amongst the available frequencies. Thus, the available bandwidth may be divided in half, thirds, fourths, or other suitable amount, and the number of bursts in each portion may be compared. If the number of bursts in each portion of the channel bandwidth is roughly similar, then the radar signal is valid. If the number of bursts in each portion of the channel bandwidth is not roughly similar, then the radar signal is invalid. Alternatively, the frequencies of all received bursts may be averaged, and the result should be close to 0 MHz. The exact threshold for determining when the distribution is close enough to the expected result may be changed at any time, by any suitable party, and may be changed dynamically.

Item 400 of FIG. 4 shows an invalid comparison of the burst frequency probability distribution. Specifically, in item 400, there are 0 bursts in the top third of frequencies, 1 burst in the middle third, and 11 bursts in the bottom third of frequencies. This distribution is heavily weighted towards the bottom third of the frequencies, and is therefore invalid. In contrast, item 405 shows a valid comparison of the burst frequency probability distribution. Specifically, in item 405, there are 4 bursts in the top third of frequencies, 3 bursts in the middle third of frequencies, and 5 bursts in the bottom third of frequencies. This distribution is roughly equal and therefore is valid.

FIG. 5 depicts an example of improved DFS radar detection in accordance with one or more embodiments. In particular, FIG. 5 shows a table of an example series of radar pulses.

In FIG. 5, a series of 24 pulses (numbered 0 to 23) are shown, with their specific intervals and width tracked. Under specification rules, pulses 3 to 18 represent 16 valid radar pulses in a row. This would be a positive radar detection and trigger DFS to leave the channel. However, the full series of pulses are, in fact, not from a radar. Rather, the interference got lucky and triggered a false positive. This false positive can be avoided by grouping the pulses based on characteristics of the pulses. This method is not intended to operate in isolation—but is instead another tool to add to any existing methods that aids in improving DFS radar detection. Said another way, there is no guarantee that a given sequence is from a single emitter. However, considering other factors can increase the accuracy. Other factors include, but are not limited to: autocorrelation, phase linearity, frequency offset, and chirp, in addition to the depicted pulse interval and pulse width.

One way to resolve the issue shown in FIG. 5 is to group similar pulses. For example, if one of the characteristics of a pulse is identical to the same characteristic of a previous pulse, the pulses may be classified as part of the same group. If a radar event only uses a portion of the group, it shall not be classified as radar. This grouping may happen before and/or after a radar event. In the example of FIG. 5, pulse #0, #1, and #2 have the same interval (300 us) as pulse #3 (which would be the first pulse of the false positive radar sequence) and thus are considered as a group. In other words, normally, #3 will be the first pulse of the sequence but because of the grouping, we don't start counting. As another example, after a potentially valid radar signal, if one characteristic continues after the potentially valid radar signal, the detection of radar may be cancelled. Normally, after reading pulse #18 of FIG. 5, a radar detected flag will be on, any subsequent pulses are ignored, and the channel must be vacated per DFS requirements. However, pulse #19 has the same interval as the prior pulses, and therefore should be grouped with the prior pulses. Pulse #19 is not a valid radar pulse, and would indicate that the prior pulses were, in fact, not radar.

Another way to reduce false positives is to consider context of the set of pulses that are being processed. In the case of FIG. 5, that is pulses 0-23. For example, pulses #21 and #23 have the same interval (300 us) as the detected radar sequence, while pulses #21 and #22 have the same pulse width (15 us) as the detected radar sequence. This indicates that this is not radar but instead, is an interference that happens to change the pulse width or interval at the "right" times to cause a false positive radar detection.

Thus, with these increased considerations, an interferer would now have to send an entire valid string of pulses. If the string of pulses begins or ends with invalid characteristics, even if part of the string is valid, the string of pulses will not be classified as radar. A single pulse may be part of any number of groups, based on any characteristics.

Figure 6:
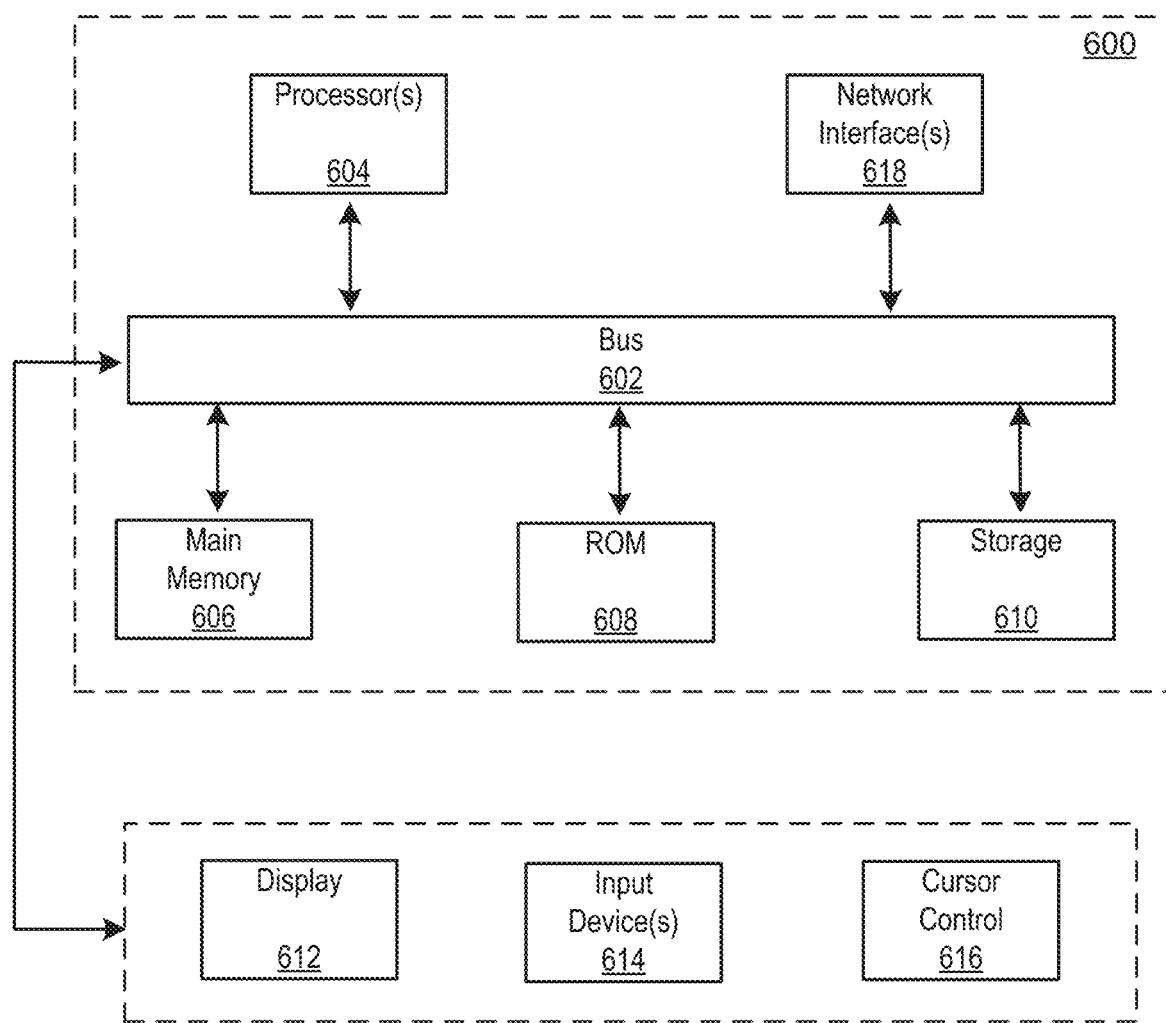
FIG. 6 depicts a block diagram of an example computer system in which various of the embodiments described herein may be implemented.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicate with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618. The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
    receiving, by an access point, pulses in a dynamic frequency selection (DFS) channel of the access point;
    determining, by the access point, characteristics of the pulses;
    processing, by the access point, the characteristics by performing a burst frequency probability distribution operation to ensure the pulses are distributed relatively evenly amongst available electromagnetic frequencies of the DFS channel;
    varying, by the access point, a threshold value of the pulses for radar detection based on the processing of the characteristics; and
    determining, by the access point, whether the pulses are radar, wherein the access point uses at least one of the characteristics and the varying of the threshold value to determine whether the pulses are radar.

2. The method of claim 1, further comprising:
    determining, by the access point, a bandwidth of the DFS channel, wherein the threshold value for radar detection is varied based on the bandwidth of the DFS channel.

3. The method of claim 2, wherein the bandwidth of the DFS channel is 160 MHz and the threshold value for radar detection is 23 bursts.

4. The method of claim 2, further comprising:
    determining, by the access point for a subset of the pulses, an average electromagnetic frequency, wherein determining whether the pulses are radar is also based on whether the average electromagnetic frequency is within an electromagnetic frequency threshold amount.

5. The method of claim 2, further comprising:
    grouping, by the access point, the pulses into bursts, each burst having a period; and determining, by the access point using the period and a count of the bursts, whether each burst of the bursts arrived at a valid time.

6. The method of claim 1, further comprising:
determining, by the access point, whether one or more characteristics of the characteristics are changing.

7. A system comprising:
memory, storing instructions which, when executed by one or more processors, cause the one or more processors to:
receive pulses in a dynamic frequency selection (DFS) channel;
determine characteristics of the pulses;
process the characteristics by performing a burst frequency probability distribution operation to ensure the pulses are distributed relatively evenly amongst available electromagnetic frequencies of the DFS channel;
vary a threshold value of the pulses for radar detection based on the processing of the characteristics; and
determine, based on at least one of the characteristics, whether the pulses are radar.

8. The system of claim 7, the instructions further causing the one or more processors to:
determine a bandwidth of the DFS channel, wherein the threshold for radar detection is varied based on the bandwidth of the DFS channel.

9. The system of claim 8, wherein the bandwidth of the DFS channel is 160 MHz and the threshold value for radar detection is 23 bursts.

10. The system of claim 8, the instructions further causing the one or more processors to:
determine, for a subset of the pulses, an average electromagnetic frequency, wherein determining whether the pulses are radar is also based on whether the average electromagnetic frequency is within a frequency threshold amount.

11. The system of claim 8, the instructions further causing the one or more processors to:
group the pulses into bursts, each burst having a period; and
determine, using the period and a count of the bursts, whether each burst of the bursts arrived at a valid time.

12. The system of claim 7, the instructions further causing the one or more processors to:
determine whether one or more characteristics of the characteristics are changing, wherein the threshold value resets when one or more characteristics change between a prior pulse and a first pulse of a possible radar or a last pulse of the possible radar and a subsequent pulse.

13. The method of claim 6, wherein the threshold value resets when one or more characteristics change between a prior pulse and a first pulse of a possible radar or a last pulse of the possible radar and a subsequent pulse.

14. Non-transitory machine-readable storage medium encoded with instructions executable by one or more processors to:
receive pulses in a dynamic frequency selection (DFS) channel;
determine characteristics of the pulses;
process the characteristics by performing a burst frequency probability distribution operation to ensure the pulses are distributed relatively evenly amongst available electromagnetic frequencies of the DFS channel;
vary a threshold value of the pulses for radar detection based on the processing of the characteristics; and
determine, based on at least one of the characteristics, whether the pulses are radar.

15. The non-transitory machine-readable storage medium of claim 14, the instructions further causing the one or more processors to:
determine a bandwidth of the DFS channel, wherein the threshold for radar detection is varied based on the bandwidth of the DFS channel.

16. The non-transitory machine-readable storage medium of claim 15, wherein the bandwidth of the DFS channel is 160 MHz and the threshold value for radar detection is 23 bursts.

17. The non-transitory machine-readable storage medium of claim 14, the instructions further causing the one or more processors to:
determine, for a subset of the pulses, an average electromagnetic frequency, wherein determining whether the pulses are radar is also based on whether the average electromagnetic frequency is within a frequency threshold amount.

18. The non-transitory machine-readable storage medium of claim 14, the instructions further causing the one or more processors to:
group the pulses into bursts, each burst having a period; and
determine, using the period and a count of the bursts, whether each burst of the bursts arrived at a valid time.

19. The non-transitory machine-readable storage medium of claim 14, the instructions further causing the one or more processors to:
determine whether one or more characteristics of the characteristics are changing, wherein the threshold value resets when one or more characteristics change between a prior pulse and a first pulse of a possible radar or a last pulse of the possible radar and a subsequent pulse.

20. The non-transitory machine-readable storage medium of claim 19, wherein the threshold value resets when one or more characteristics change between a prior pulse and a first pulse of a possible radar or a last pulse of the possible radar and a subsequent pulse.

* * * * *